(12) United States Patent
Chang et al.

(10) Patent No.: US 9,711,903 B2
(45) Date of Patent: Jul. 18, 2017

(54) CONNECTOR SYSTEM WITH RFID CIRCUIT

(71) Applicant: MOLEX INCORPORATED, Lisle, IL (US)

(72) Inventors: Lily T. C. Chang, Lisle, IL (US); Timothy Gagnon, Aurora, IL (US); Steven Zeilinger, Carol Stream, IL (US)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/123,972

(22) PCT Filed: Mar. 19, 2015

(86) PCT No.: PCT/US2015/021510
§ 371 (c)(1),
(2) Date: Sep. 6, 2016

(87) PCT Pub. No.: WO2015/143183
PCT Pub. Date: Sep. 24, 2015

(65) Prior Publication Data
US 2017/0077650 A1    Mar. 16, 2017

Related U.S. Application Data

(60) Provisional application No. 61/968,054, filed on Mar. 20, 2014.

(51) Int. Cl.
*H01R 13/641*   (2006.01)
*H01R 13/627*   (2006.01)
*G06K 19/073*   (2006.01)
*G06K 19/077*   (2006.01)
*H01Q 1/22*     (2006.01)

(52) U.S. Cl.
CPC ..... *H01R 13/641* (2013.01); *G06K 19/07345* (2013.01); *G06K 19/07737* (2013.01); *H01Q 1/2225* (2013.01); *H01R 13/6272* (2013.01)

(58) Field of Classification Search
CPC   H01R 13/641; H01R 9/2475; H01R 13/6272; H01R 13/7175; H01R 13/717; G08B 13/1409; G08B 13/1463; G06K 19/07749
USPC ........ 439/489, 490; 340/568.4, 572.8, 572.1, 340/568.1, 571
See application file for complete search history.

(56) References Cited

U.S. PATENT DOCUMENTS 6,916,128 B1 *  7/2005  Petteruti ................... B41J 3/36
                                                          400/691
7,244,142 B2 *  7/2007  Kato ..................... F16B 1/0071
                                                          340/568.4

(Continued)

FOREIGN PATENT DOCUMENTS

JP    2004-349184 A    12/2004
JP    2005-315653 A    11/2005
JP    2011-135984 A     7/2011

*Primary Examiner* — Gary Paumen
(74) *Attorney, Agent, or Firm* — James A. O'Malley

(57) ABSTRACT

A connector is provided that includes an RFID circuit. Before the connector is mated with a corresponding connector the RFID circuit is tuned so that it does not function in a desired manner at a desired frequency. Once the connector is mated the tuning of the RFID circuit is modified so that the RFID circuit functions in the desired manner at the desired frequency.

9 Claims, 20 Drawing Sheets

(56) References Cited

U.S. PATENT DOCUMENTS

| | | |
|---|---|---|
| 7,854,623 B2 | 12/2010 | Radenne et al. |
| 2005/0063125 A1 | 3/2005 | Kato |
| 2005/0253726 A1* | 11/2005 | Yoshida .................. B60R 25/04 340/572.8 |
| 2006/0050464 A1* | 3/2006 | Von Arx .............. H01R 9/2425 361/104 |
| 2015/0169915 A1* | 6/2015 | Petre .................. G06K 19/0702 340/10.6 |

* cited by examiner

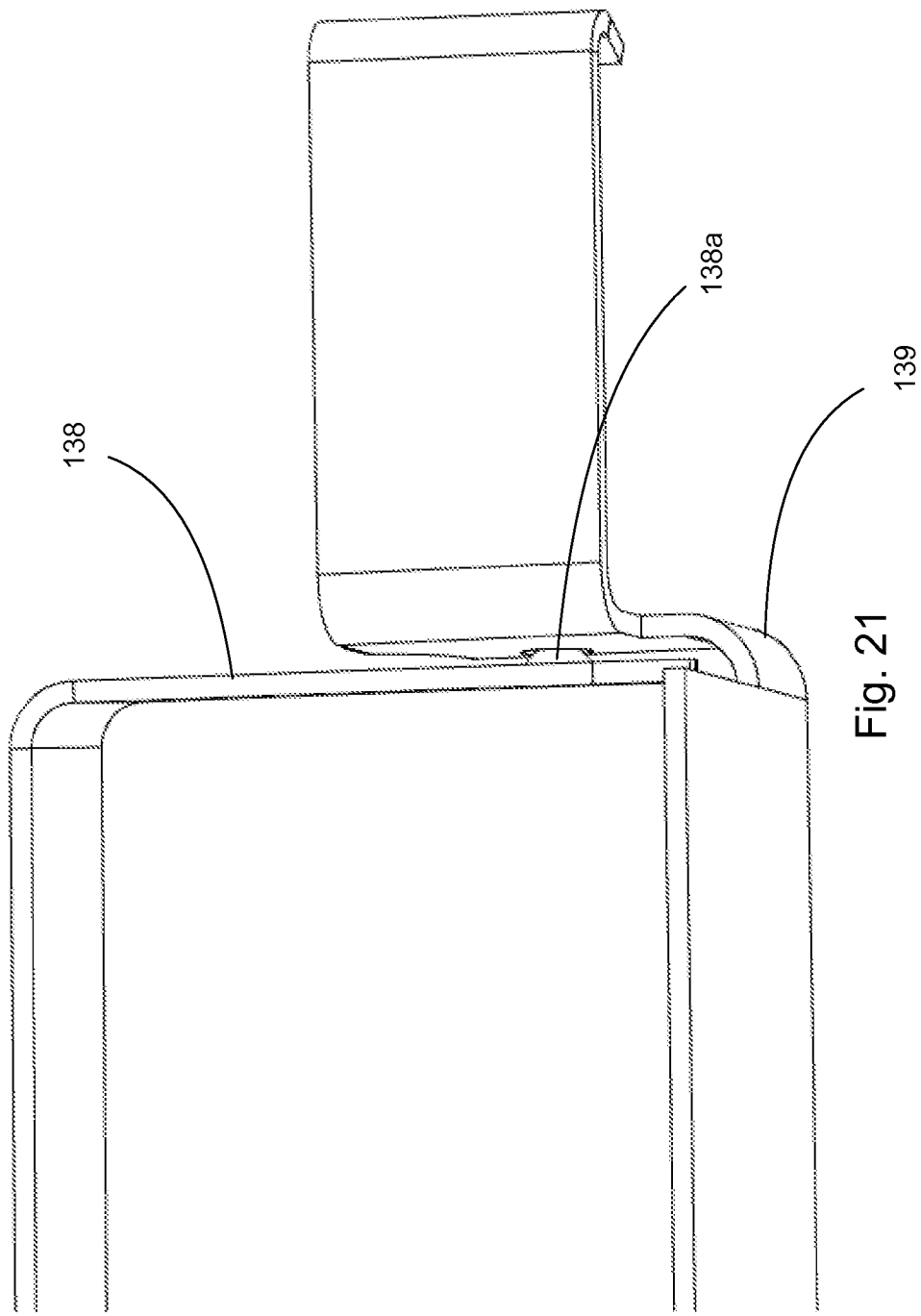

CONNECTOR SYSTEM WITH RFID CIRCUIT

RELATED APPLICATIONS

This application claims priority to U.S. Provisional Appl. No. 61/968,054, filed Mar. 20, 2014, which is incorporated herein by reference in its entirety.

TECHNICAL FIELD

This disclosure relates to the field of connectors, more specifically to the field of connectors suitable for use in hard to reach locations.

DESCRIPTION OF RELATED ART

Connectors for wiring harnesses are well known. Depending on the use of the wiring harness, the connector can be made more or less robust and can include seals to provide water resistance. To ensure the connectors do not become disassembled while in use, two mating connectors (which form a connecter system) can include a latch to help hold the connectors together in the mated position. When properly connected, the connectors are very reliable and can readily resistance the expected environmental conditions.

One issue that can arise, however, is a partially seated connector system. Depending on the insertion force experienced (which will tend to be higher if the connecter includes seals for water resistance and includes stiffer terminals to provide for a reliable mating force of over a wide range of conditions including harsh noise, vibration and harshness (NVH) environments), it may be possible for a connector to be pressed together so that the housings are secured to each other without having the connectors fully assembled. To minimize this from happening, connector systems often include a latch that provides a positive feedback (such as a snap) that includes a tactile feel and an audible sound. These feedback mechanisms, however, are only partially effective in situations where the connector system is being assembled in a noisy environment. And if the person assembling the connector system is distracted then it is still possible for a partially mated connector system to occur, which can be problematic in situations where it is more difficult to fully mate the connector system later.

One attempt to resolve this is disclosed in U.S. Pat. No. 7,854,623, which discloses the use of a radio frequency identification (RFID) chip that can be shorted out when two connectors are mated (or unmated). The depicted design has certain short comings, however and therefore certain individuals would appreciate further improvements in a connector system.

SUMMARY

In an embodiment a connector system includes a first connecter and a second connector that are configured to be mated together. The first connector includes a radio frequency identification (RFID) chip with an antenna system that is unable to respond with the desired signal level at a frequency of interest. The second connector includes a latch with a bar that engages the antenna system when the first and second connectors are properly mated. The bar is configured to modify the antenna system's frequency response so that it responds with a desired signal level at the frequency of interest. Thus, the bar acts to configure the RFID circuit into a functioning circuit when the bar engages the antenna system.

In another embodiment a first connector includes a RFID chip provided on an antenna system with the antenna system having an open circuit or break such that the antenna system does not provide a desired performance at a desired frequency. The connector includes a latch with a first conductive member and a second conductive member that are not directly connected in an unmated state. The first conductive member is part of a first portion of the antenna system and the second conductive member is part of a second portion of the antenna system. When the first connector is mated to a second connector, the second conductor includes a retaining member that engages the latch and causes the first and second conductive members to become directly connected so that the antenna system becomes tuned to a desired frequency.

BRIEF DESCRIPTION OF THE DRAWINGS

The present invention is illustrated by way of example and not limited in the accompanying figures in which like reference numerals indicate similar elements and in which:

FIG. 21 illustrates another perspective view of the embodiment depicted in FIG. 20.

DETAILED DESCRIPTION

Figure 1:
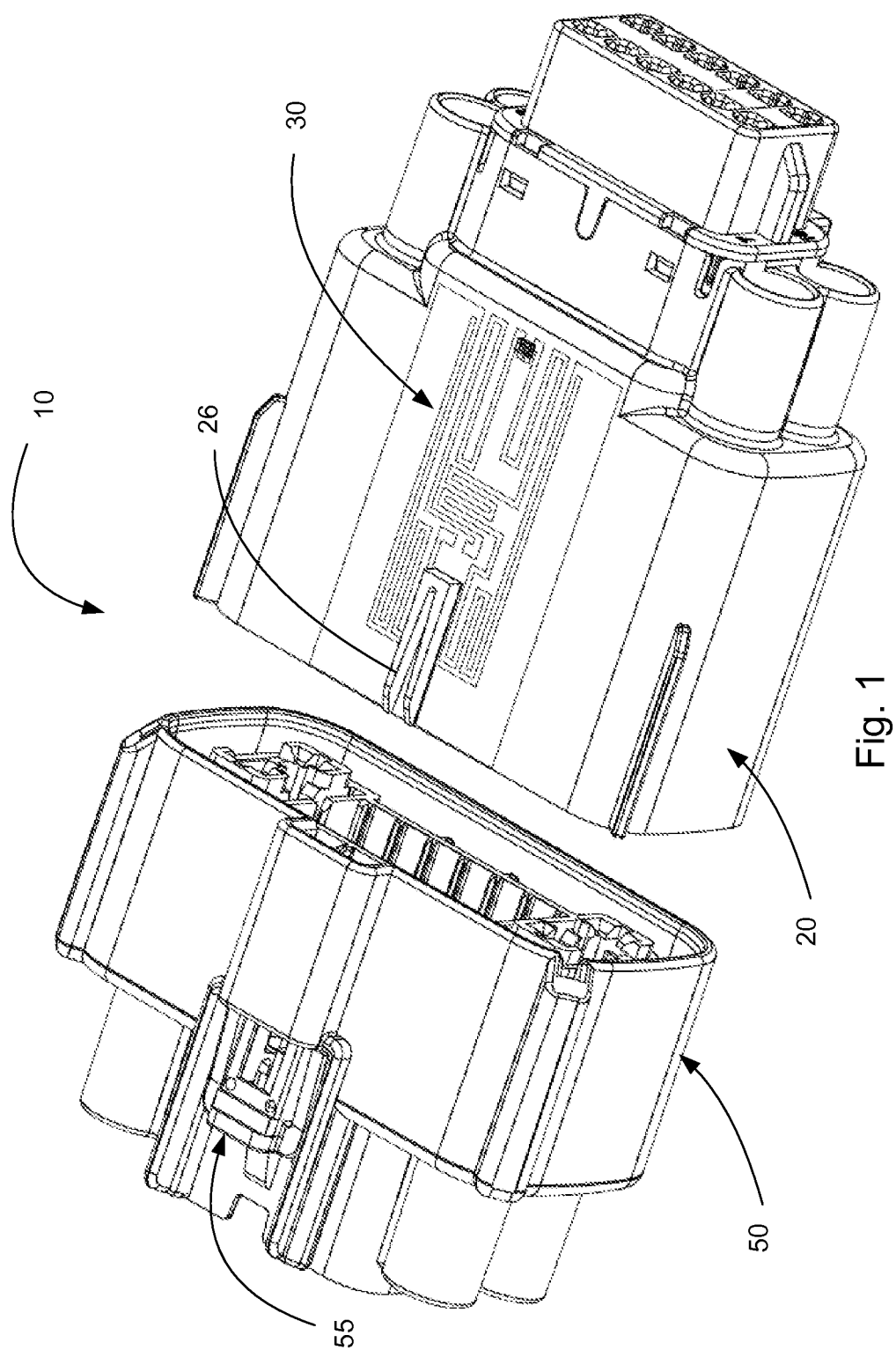
FIG. 1 illustrates a perspective view of a first embodiment of a connector system with an RFID circuit in an unmated condition.
Figure 2:
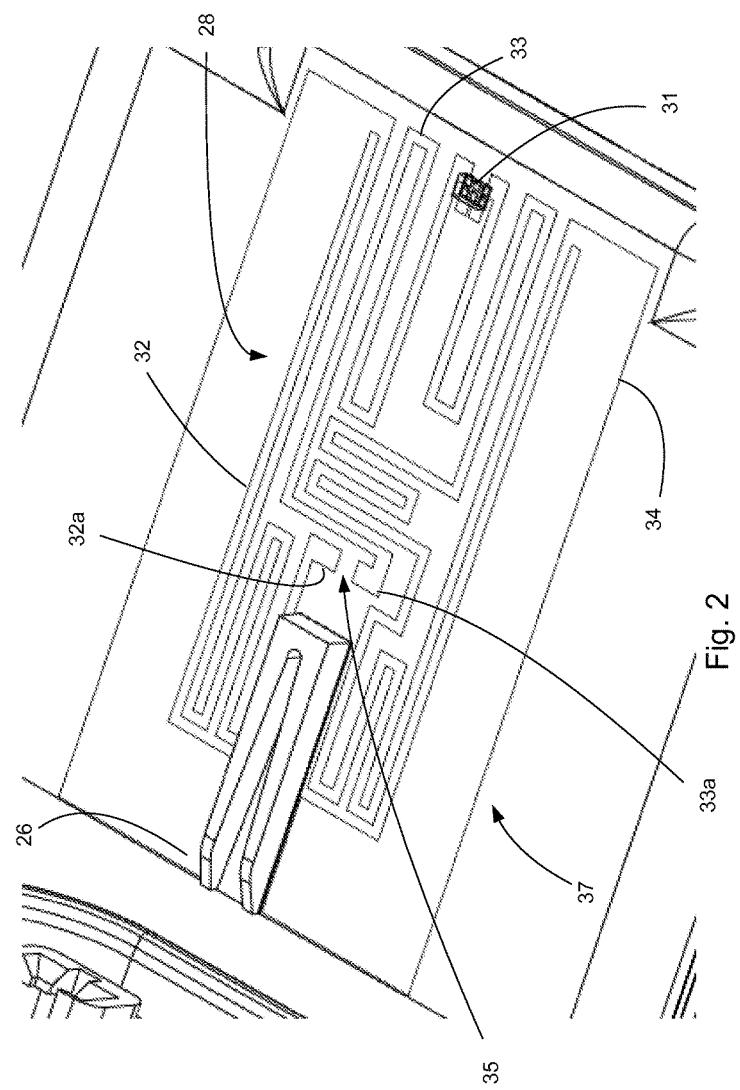
FIG. 2 illustrates a perspective enlarged view of a portion of an antenna pattern.
Figure 3:
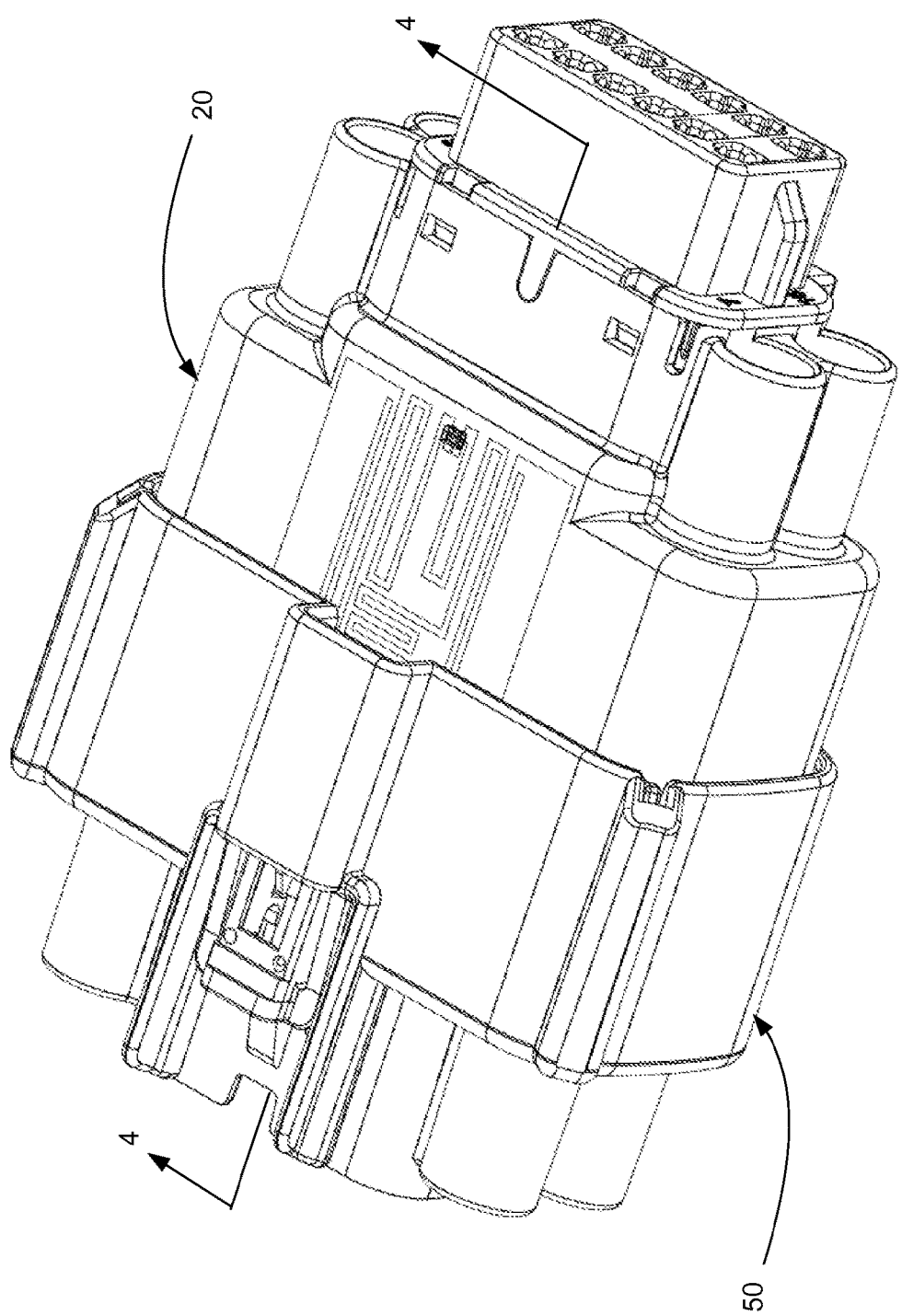
FIG. 3 illustrates a perspective view of the connector system of FIG. 1 in a mated condition.
Figure 4:
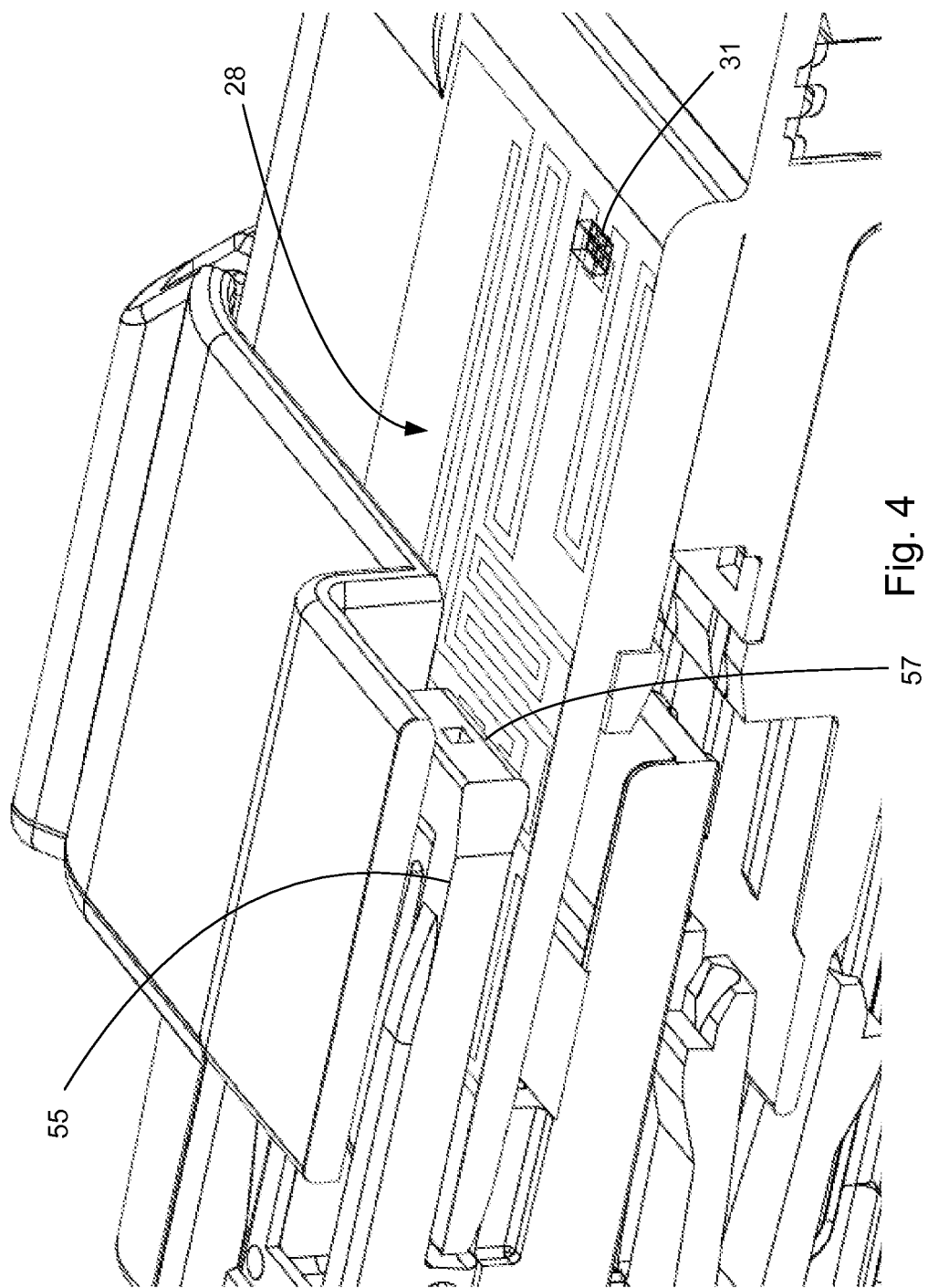
FIG. 4 illustrates a perspective view of a cross section of the embodiment depicted in FIG. 3, taken along line 4-4.
Figure 5:
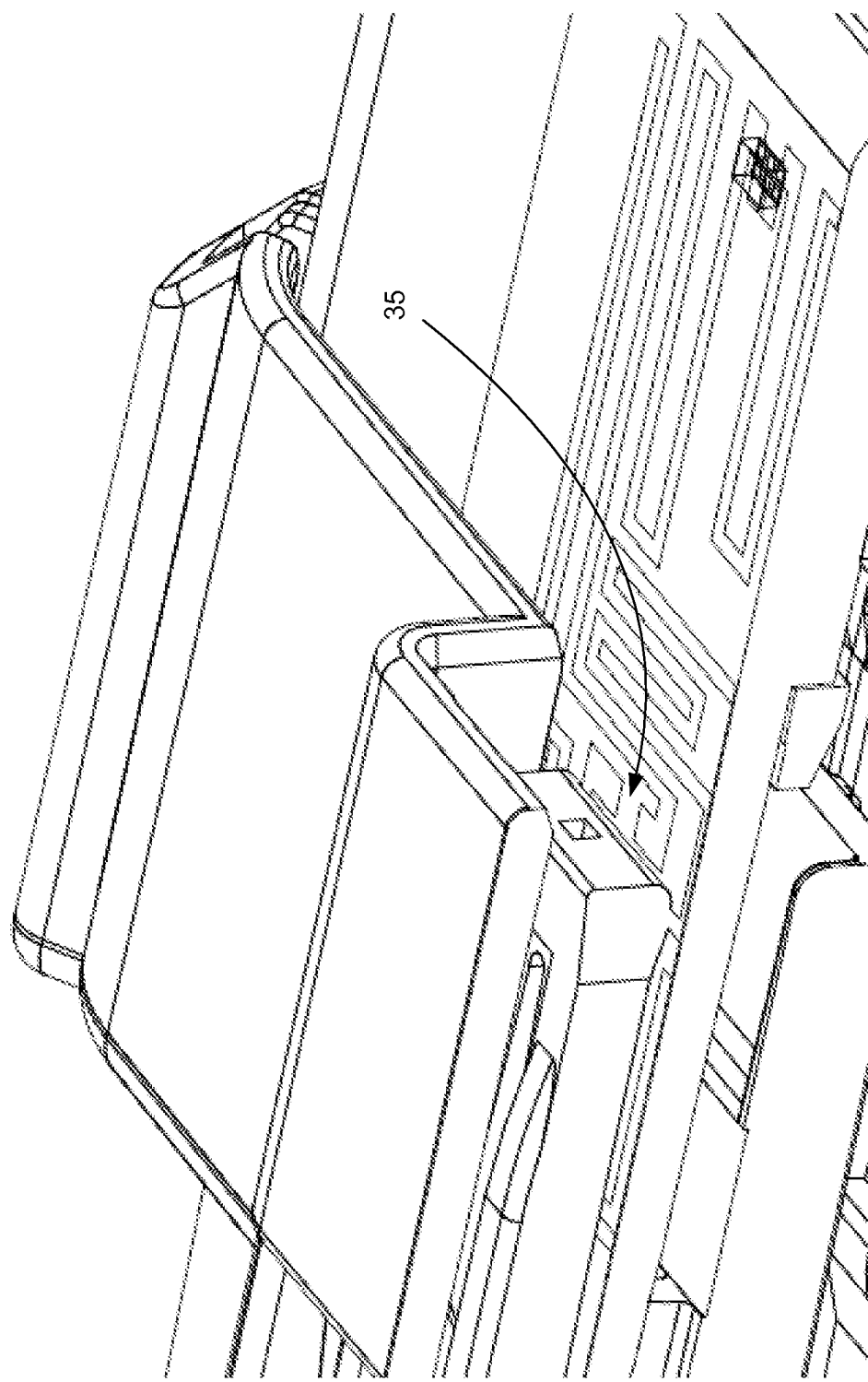
FIG. 5 illustrates a perspective view of the embodiment depicted in FIG. 4 but with one of the connectors translated.

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

Radio frequency identification (RFID) circuits, due in part to their low cost and the fact that they do not require a power source, are commonly used in situations where it is desirable to determine the location of an item. The low cost allows for the inclusion of an RFID circuit in a connector without substantially increasing the costs. As used herein, an RFID circuit includes an antenna and an integrated circuit (IC) and is configured to receive a signal via the antenna (which operational provides power), process the signal with the IC and provide an output via the antenna (as is conventional for RFID circuits).

FIGS. 1-5 illustrate a connector system 10 with a first connector 20 that includes an integrated RFID circuit 30. The connector system 10 further includes a second connector 50 with a latch arm 55. Each of the connectors 20, 50 includes a plurality of terminals that are configured to be electrically connected together when the connectors 20, 50 are in a mated position. The connector 20 includes an RFID circuit 30 formed on the connector 20 and the RFID circuit 30 includes an antenna pattern 37. Examples of technologies that can be used to form the antenna pattern include, but are not limited to, laser direct structuring (LDS) followed by a plating, stamping, two-shot molding, any molding, including molded interconnect device (MID) technology, ink jets, nanoparticles, any other type of conductive coating, flexible circuit (adhesive), ILM, insert molding a thin layer. In other words, the method of forming the antenna pattern on the connector is not intended to be limiting.

As depicted, the RFID circuit 30 includes a RFID chip 31 positioned on the antenna pattern 37. The antenna pattern 37 includes a first portion 32, a second portion 33 and a third portion 34. The first portion 32 includes an arm 32a and the second portion 33 includes an arm 33a. The arms 32a, 33a define a break 35 and in operation a bar 57 on the latch arm 55 can bridge the break 35. When the break 35 is open the antenna pattern 37 has a resonance that is at a first frequency that can be outside a desired operating frequency range. In other words, when the first connector 20 is not fully mated to the second connector 50 the RFID circuit 30 does not work as intended. When the break 35 is closed (which is representative of the connector system 10 being fully mated) the antenna pattern 37 has a resonance that is at a second frequency that is with a desired operating frequency range.

As depicted, the second connector 50 includes the latch arm 55 and the latch arm 55 includes the bar 57 provided on the bottom side. In operation, the latch arm 55 rides up over ramp 26 and then drops down so that the bar 57 shorts the break 35.

Figure 6:
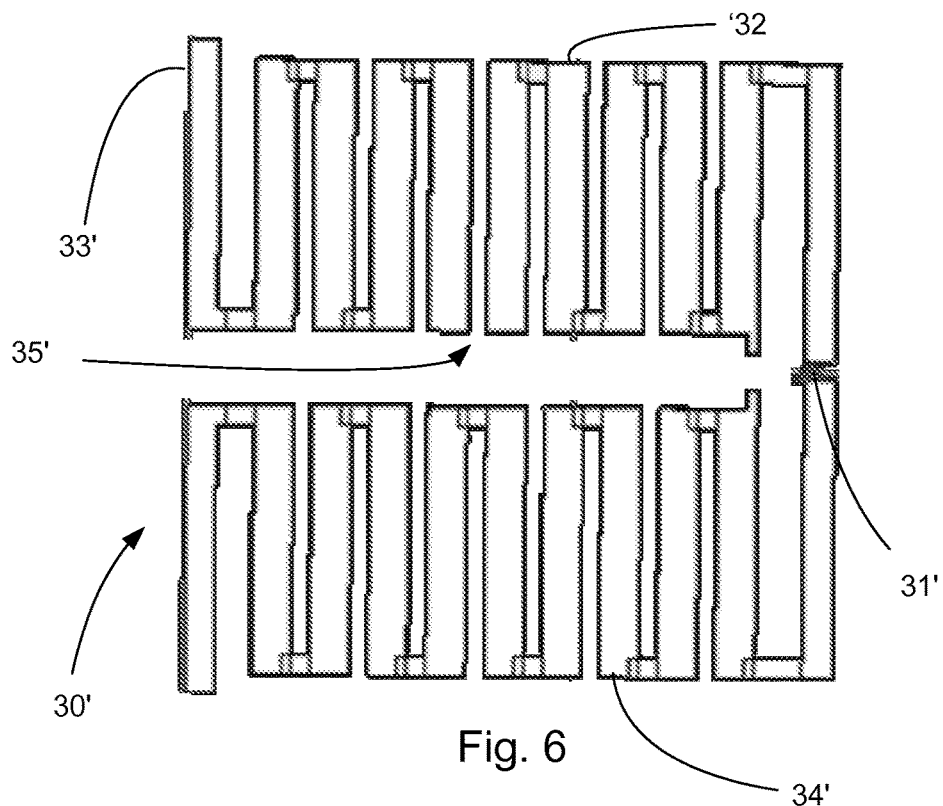
FIG. 6 illustrates a top view of an antenna pattern.
Figure 7:
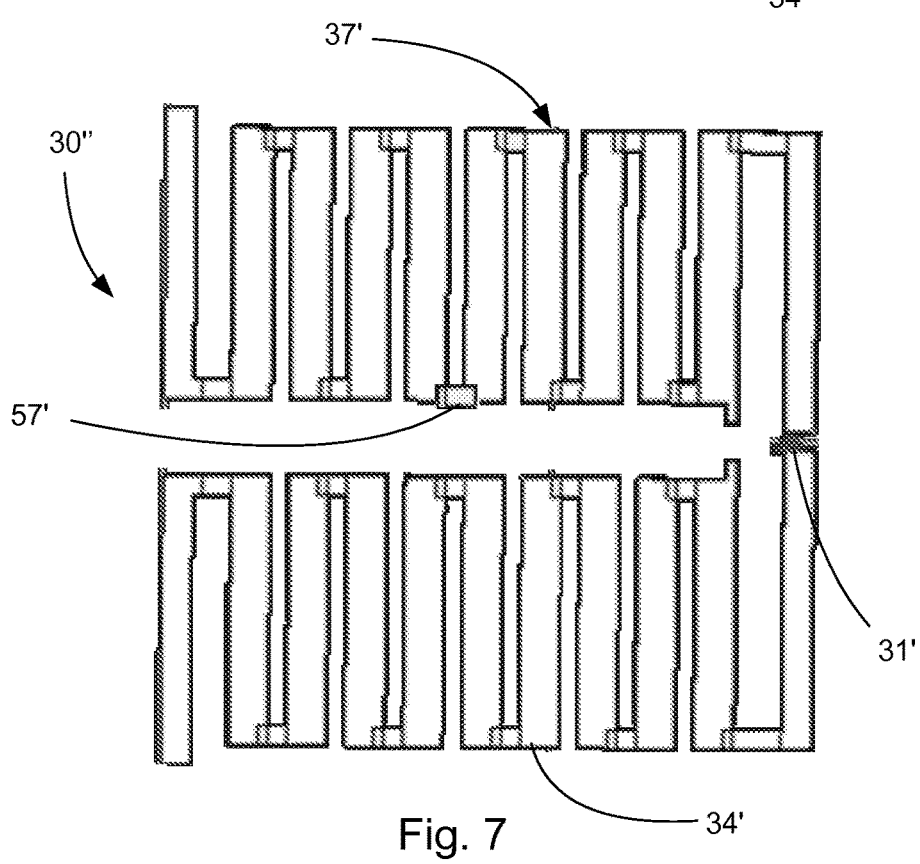
FIG. 7 illustrates a top view on another antenna pattern.

As can be appreciated from FIGS. 6-7, which are representative of RFID circuit similar to the RFID circuit depicted in FIGS. 1-5, an RFID circuit 30' includes a chip 31' (which can be programmed to provide an output signal in response to an output signal) and a first antenna portion 32', a second portion 33' and a third portion 34' that collectively define an antenna pattern 37' and the RFID circuit 30' is configured so that it is not functional at the desired frequency when there is a break 35' between the first portion 32' and the second portion 33'. However, once the break is shorted, which is shown in FIG. 7, (and which is representative of two connectors being fully mated such that the sets of terminals in the respective connectors are electrically connected together) the RFID circuit 30' is performance is modified and the RFID circuit 30' is configured to function at the desired frequency. The RFID circuit 30' is provided because a bar 57' bridges the break 35' between the first antenna portion 32' and the second antenna portion 33' so as to provide the effective antenna pattern 37' and the resulting RFID circuit 30'' is thus configured to respond to an input signal by providing an appropriate output signal at a desired frequency. Thus, the bar 57' enables the RFID circuit 30 to become RFID circuit '30 when the bar '57 shorts the first antenna portion '32 with the second portion '33.

As can be appreciated from FIGS. 1-5, the bar 57 is provided on a latch arm 55. While the depicted latch arm 55 acts as a latch because of ramp 26, which helps retain the connectors 20, 50 together, it is also possible that the latch arm 55 and bar 57 could short the break 35 between the first and second antenna portions 32, 33 without the ramp 26 and something else could be used to holder the connectors 20, 50 together once they are mated. Thus the latch arm 55 need not be configured to secure the connectors in a mated condition. As can be appreciated, if the connectors 20, 50 are not properly mated then the bar 57 will not short the break 35 and the connector system 10 will not respond to an input signal with an output signal that indicates the connector system is mated (at least not with the desired output at the desired frequency). The depicted system therefore allows for a wireless check of the connector system without requiring an entire wiring harness to be connected up to diagnostic equipment. And as can be appreciated, the depicted system does not require a secondary arm as the latch arm both 55 secures the connector system 10 in a mated condition and enables the RFID circuit 30 to function as desired once the connectors are fully mated.

Figure 8:
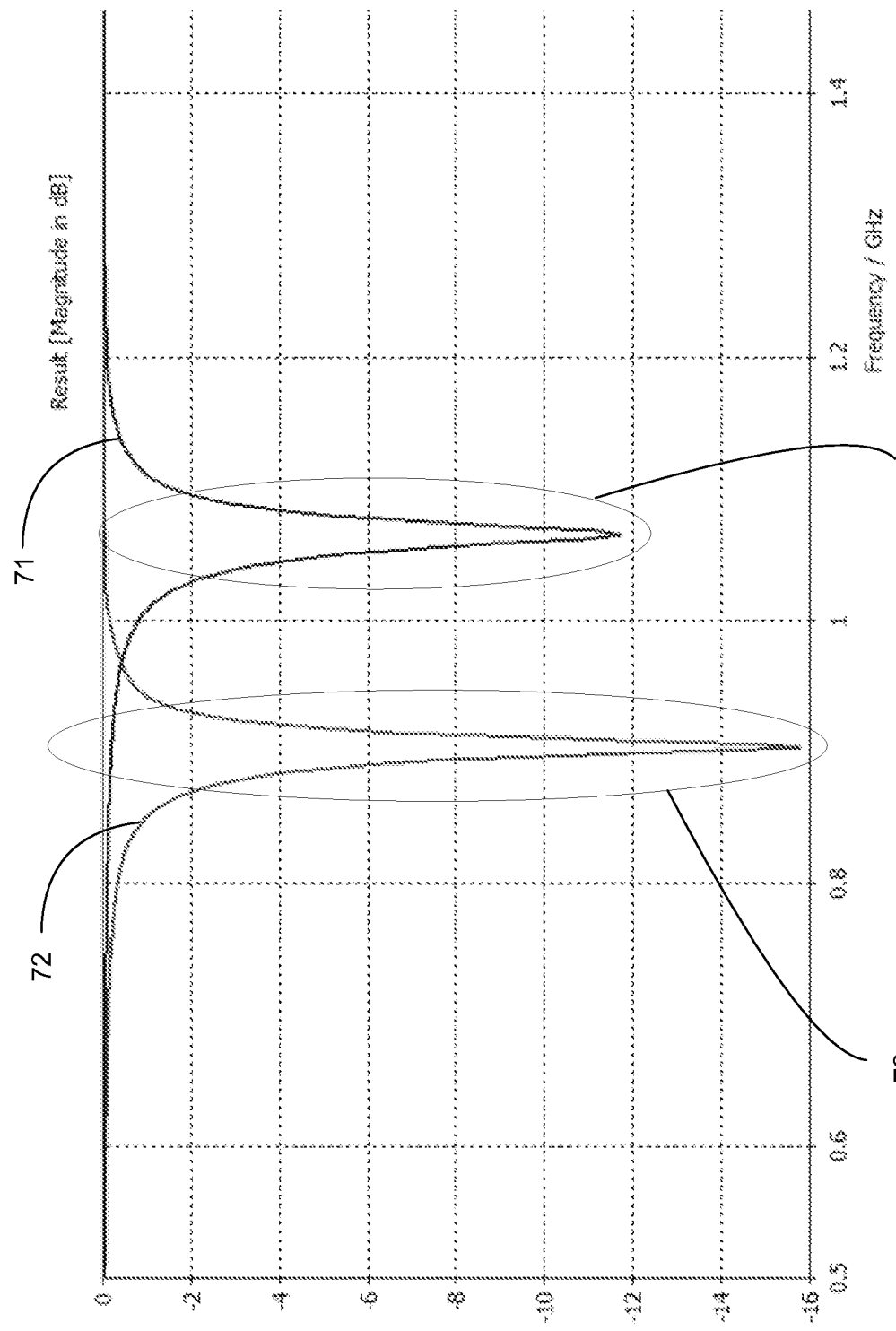
FIG. 8 illustrates a chart of antenna resonance versus frequency.
Figure 9:
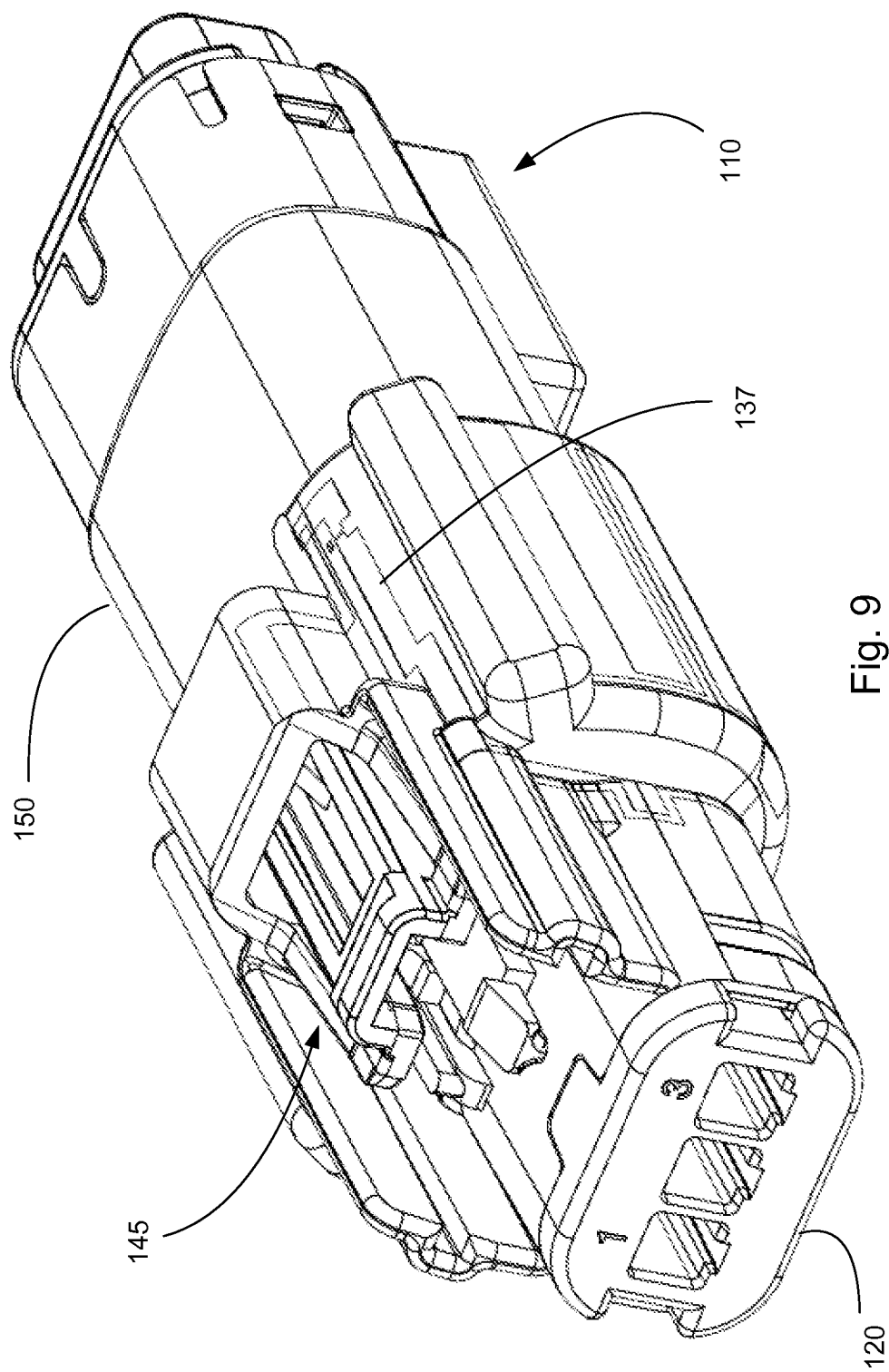
FIG. 9 illustrates a perspective view of another embodiment of a connector system.
Figure 10:
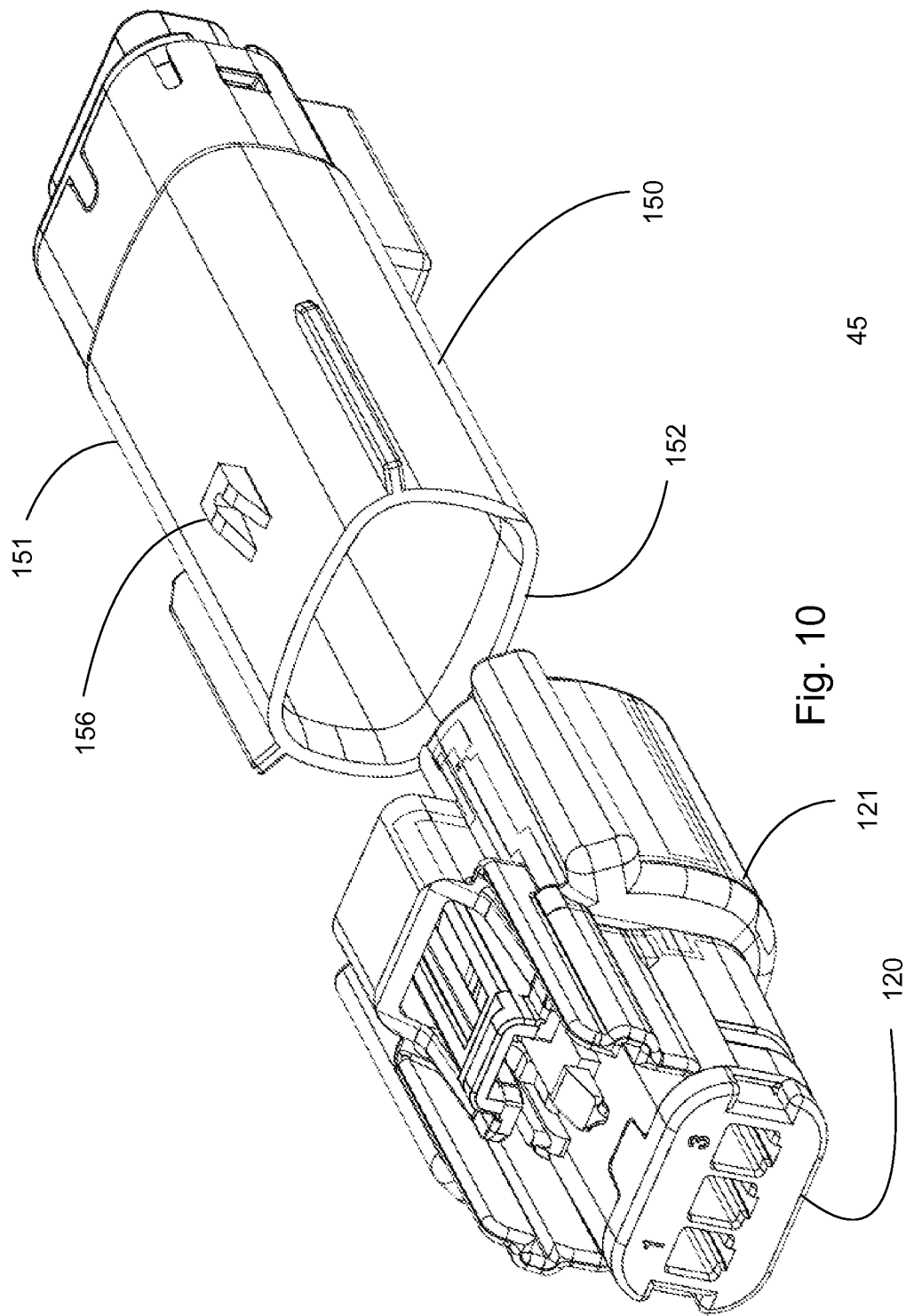
FIG. 10 illustrates a perspective view of the connector system depicted in FIG. 10 with the antennas in an unmated condition.
Figure 11:
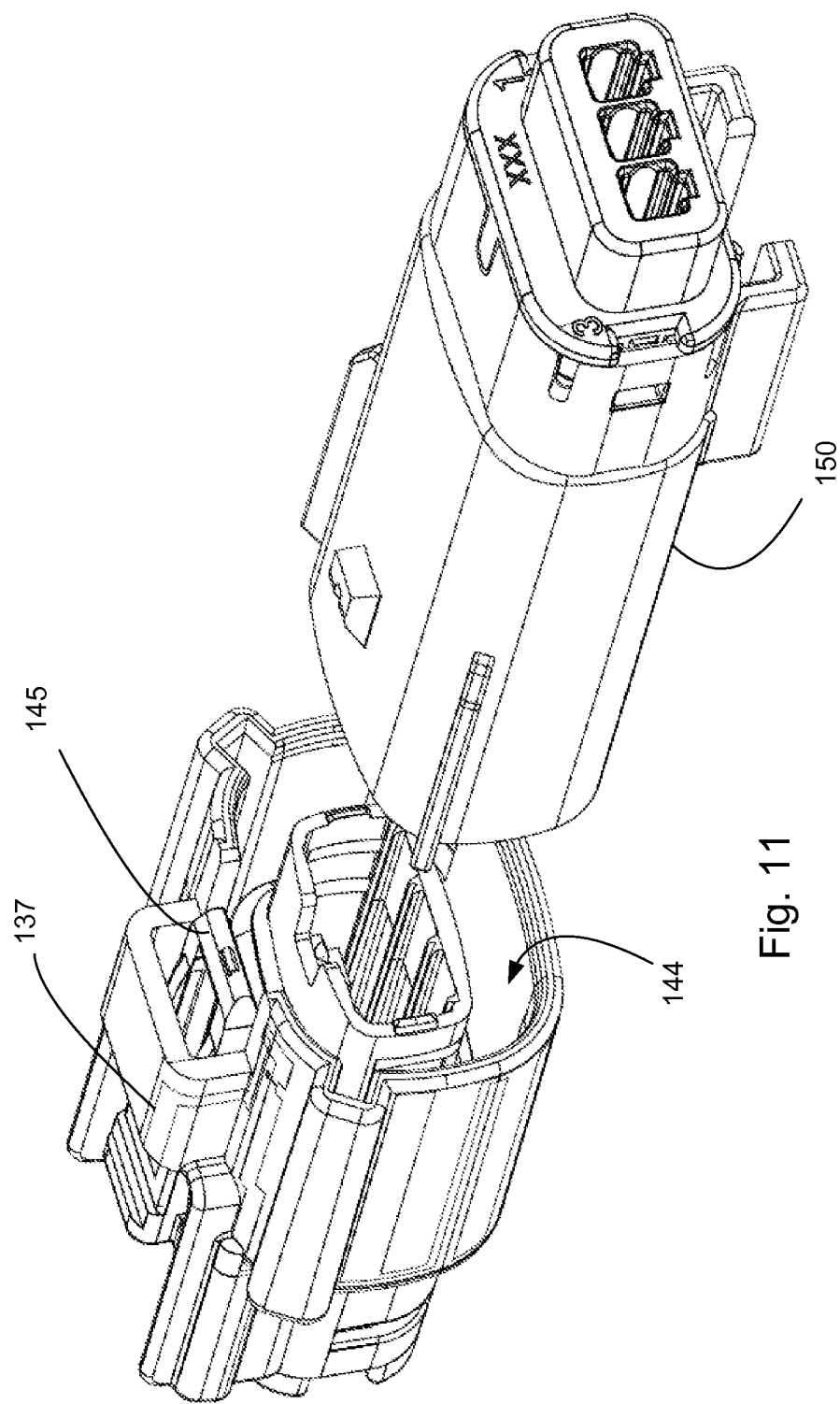
FIG. 11 illustrates another perspective view of the embodiment depicted in FIG. 10.
Figure 12:
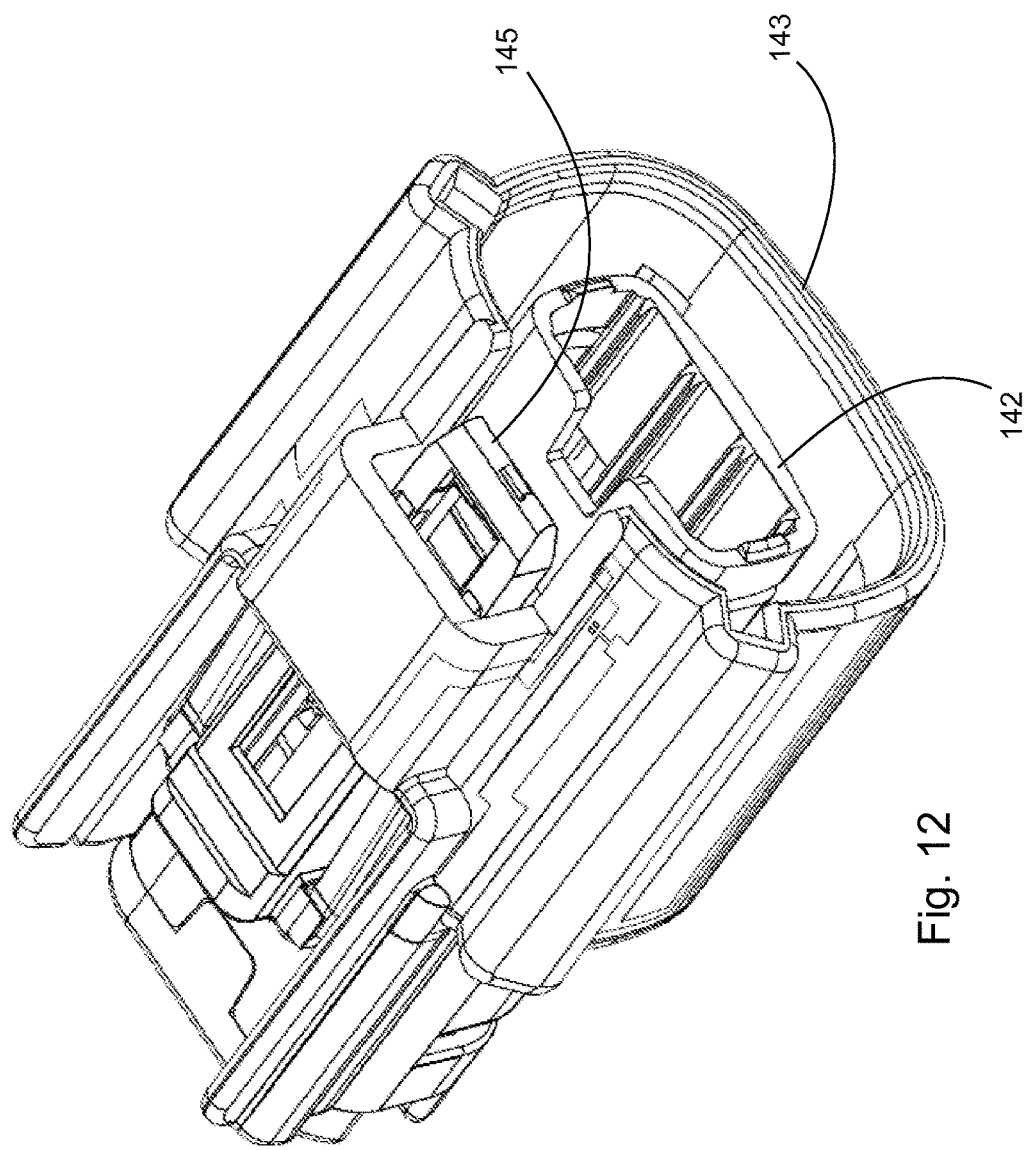
FIG. 12 illustrates a perspective view of an embodiment of a connector.
Figure 13:
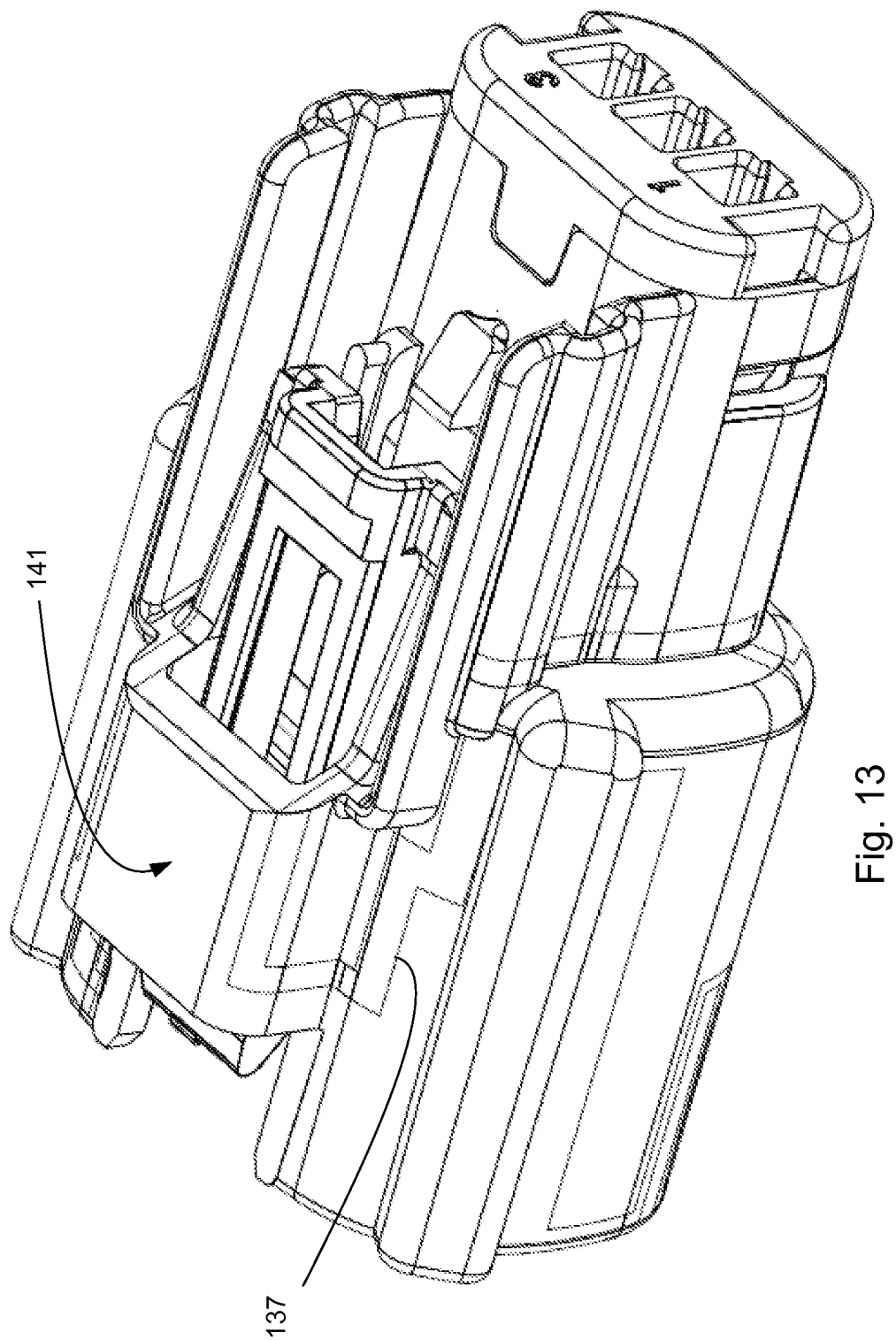
FIG. 13 illustrates another perspective view of the connector depicted in FIG. 12.
Figure 14:
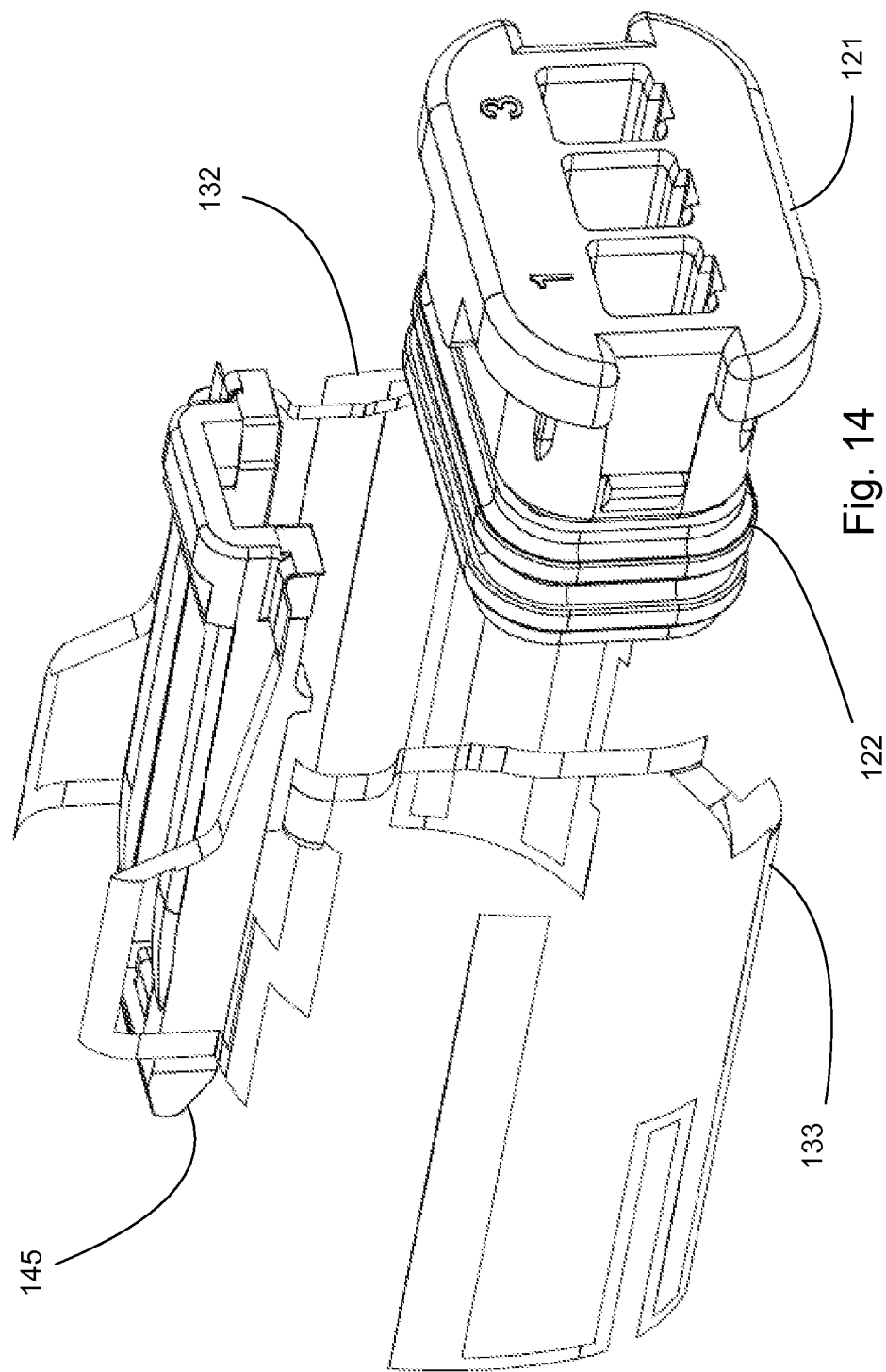
FIG. 14 illustrates a simplified perspective view of the connector depicted in FIG. 13 with a portion of the housing removed for purposes of illustration.
Figure 15:
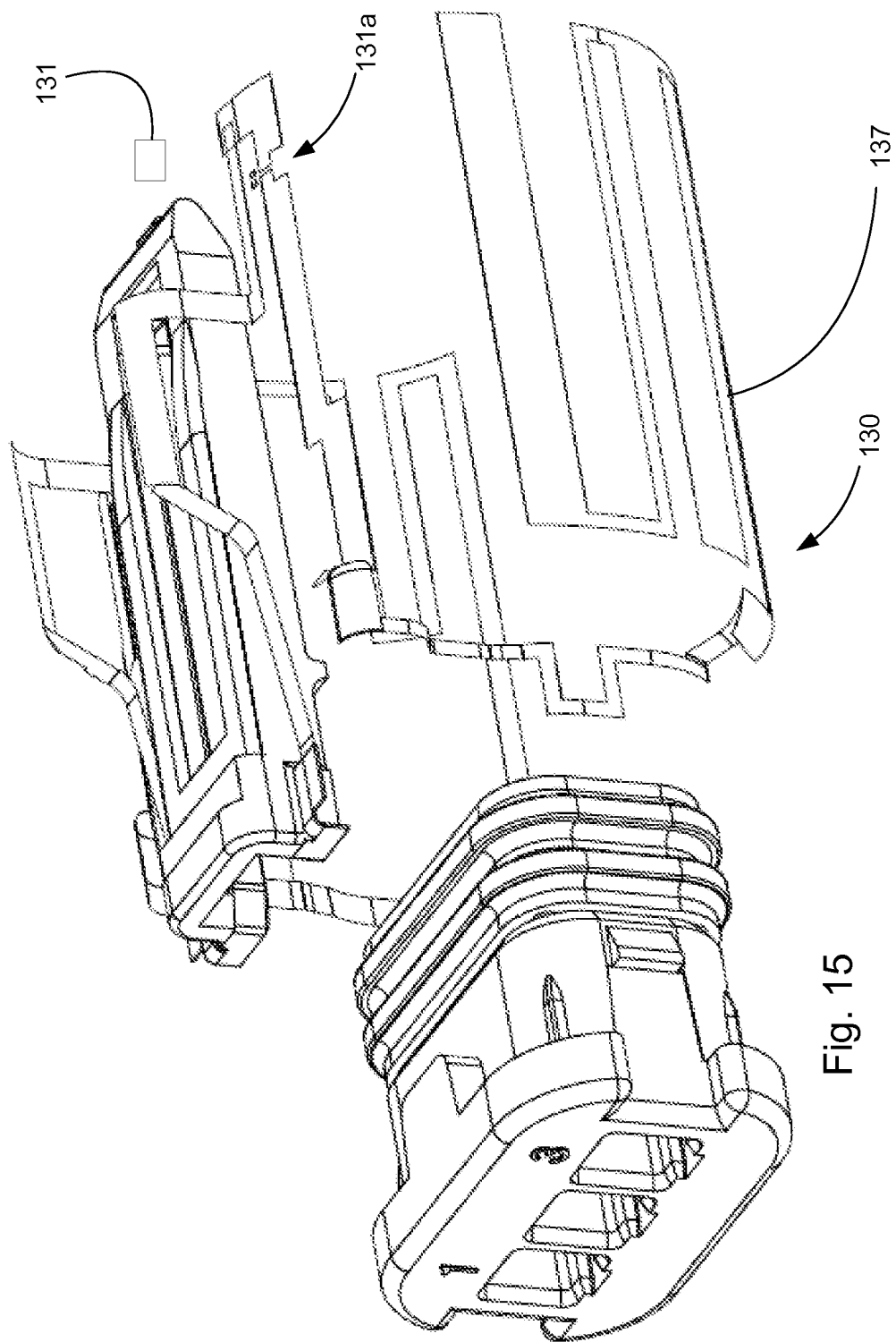
FIG. 15 illustrates another perspective view of the embodiment depicted in FIG. 14.
Figure 16:
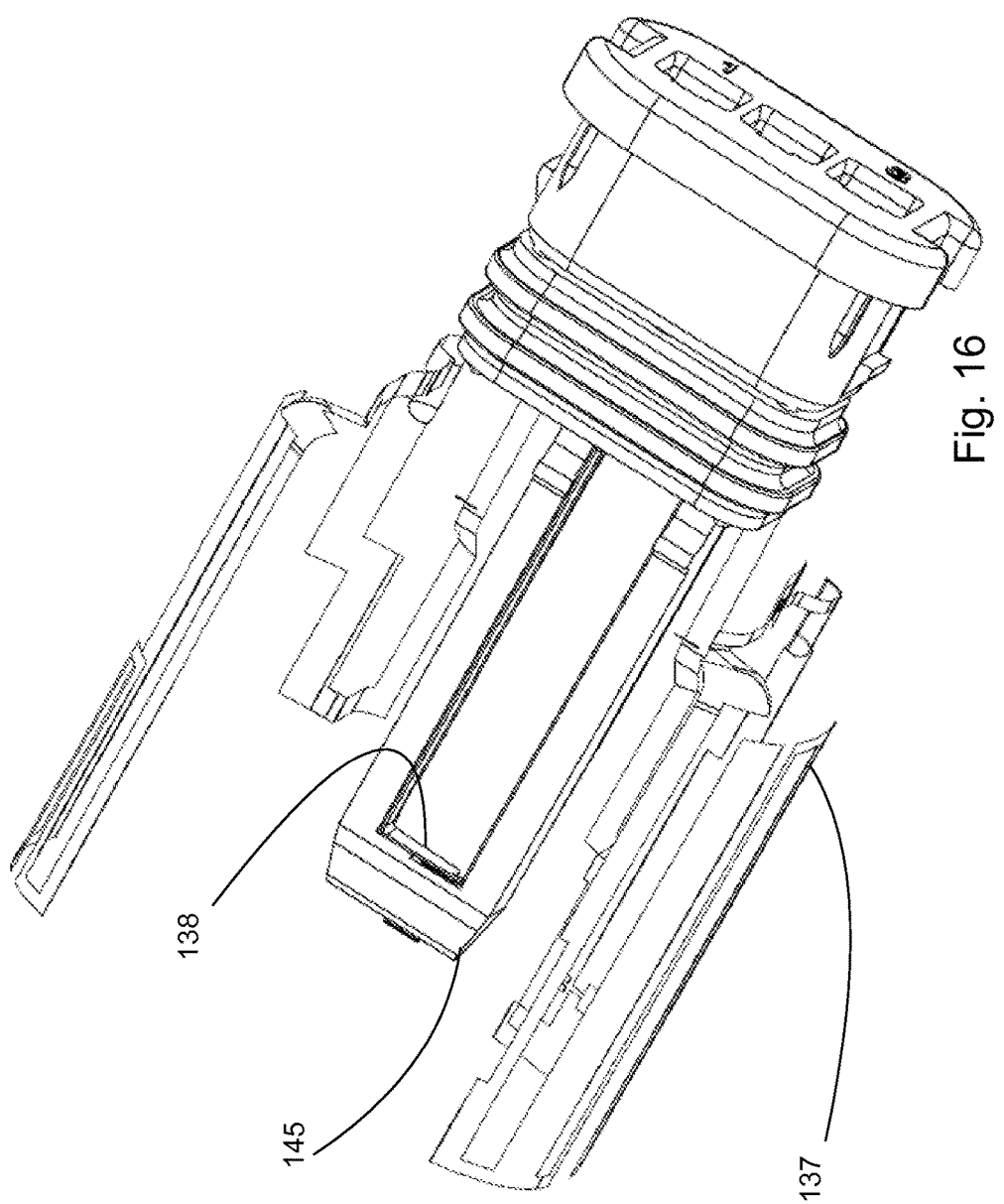
FIG. 16 illustrates another perspective view of the embodiment depicted in FIG. 14.
Figure 17:
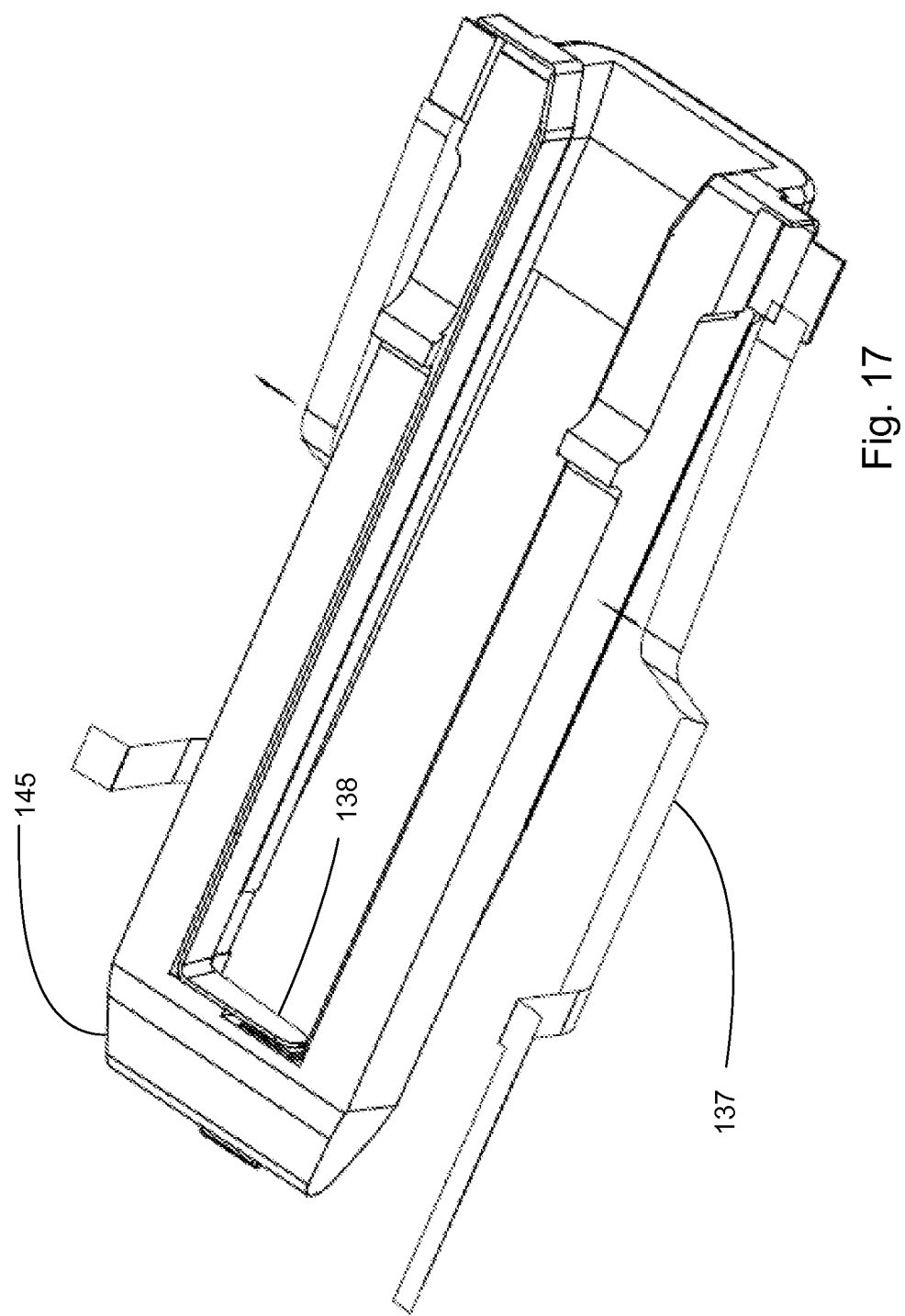
FIG. 17 illustrates a simplified perspective view of an embodiment of a latch arm.
Figure 18:
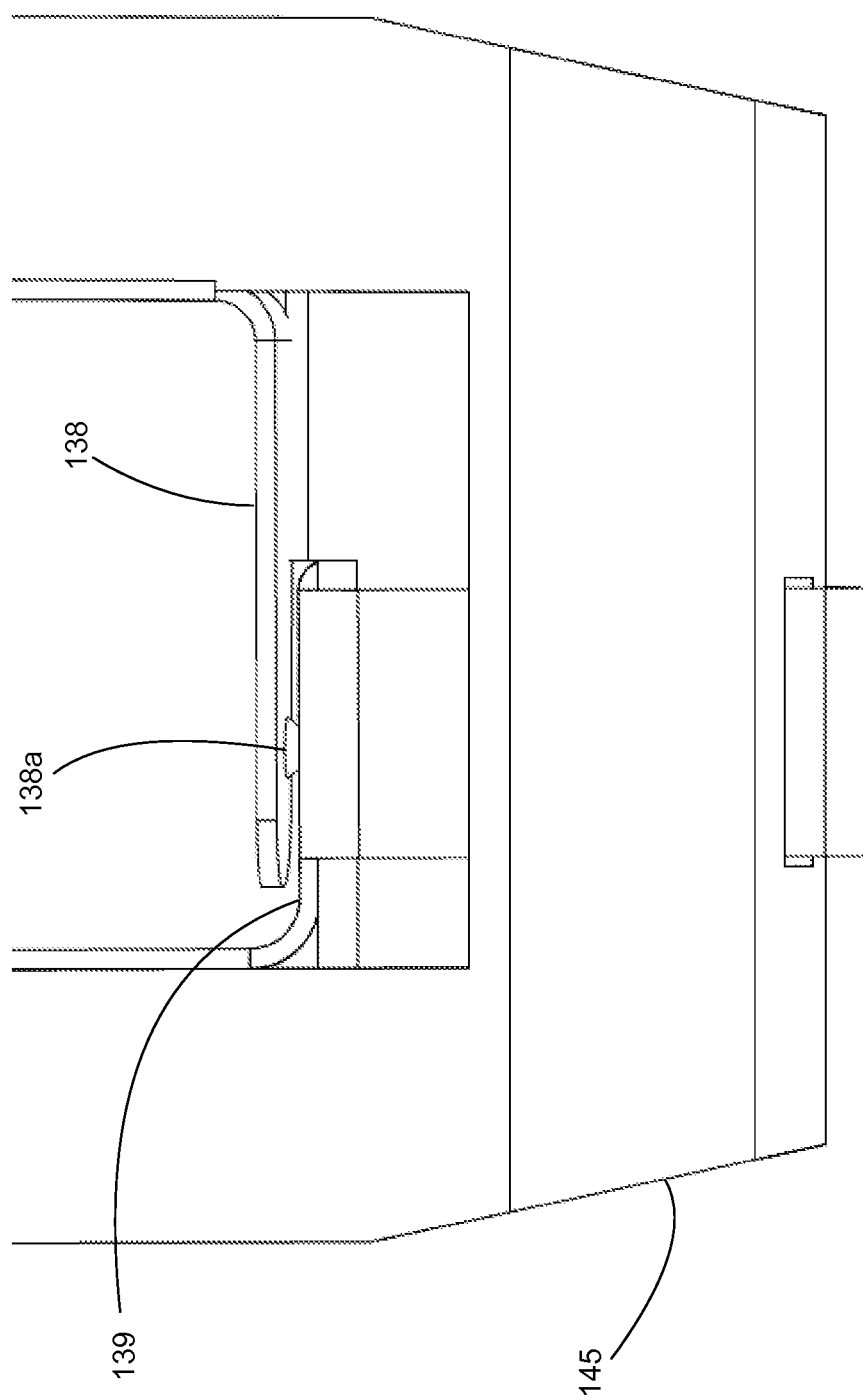
FIG. 18 illustrates an enlarged perspective view of the latch arm depicted in FIG. 17.
Figure 19:
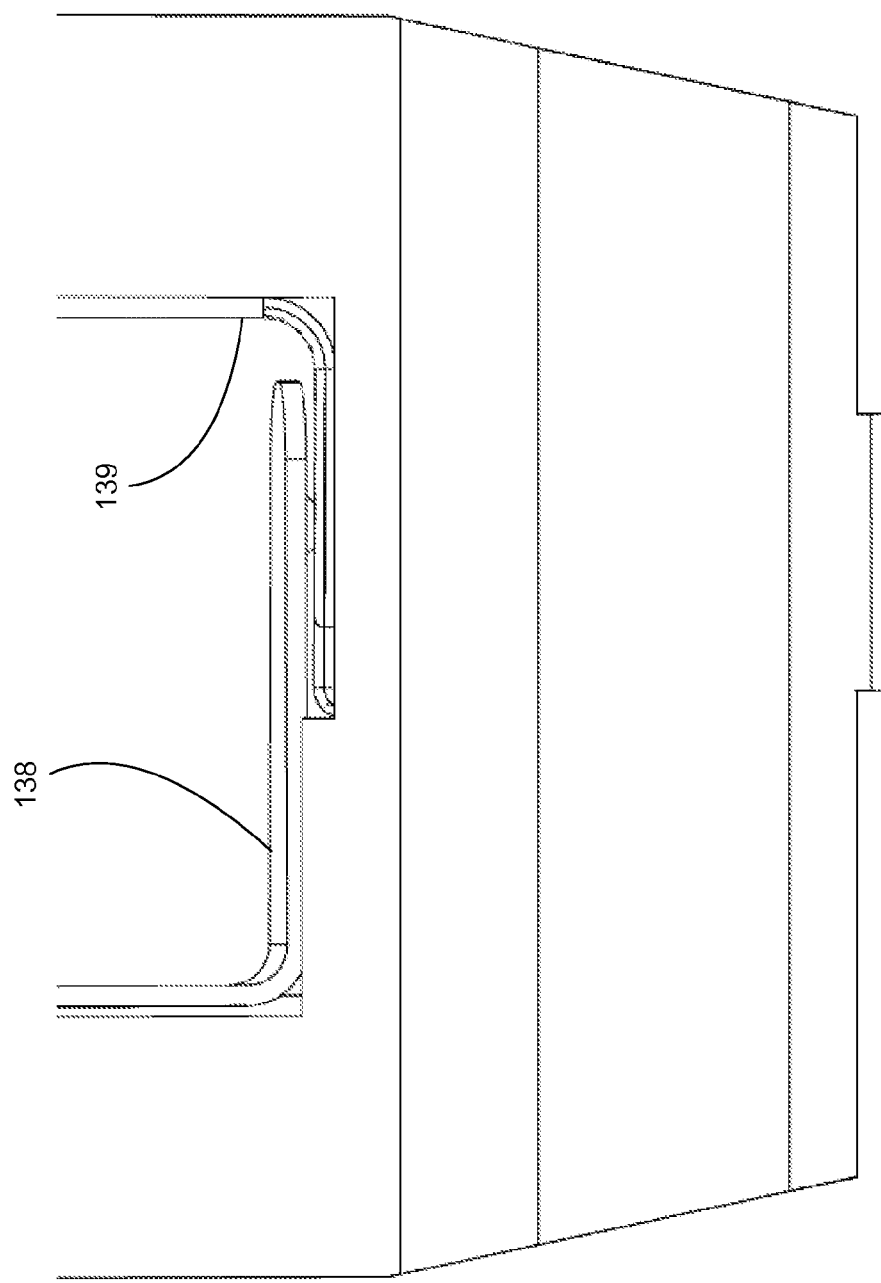
FIG. 19 illustrates another perspective view of the embodiment depicted in FIG. 18.
Figure 20:
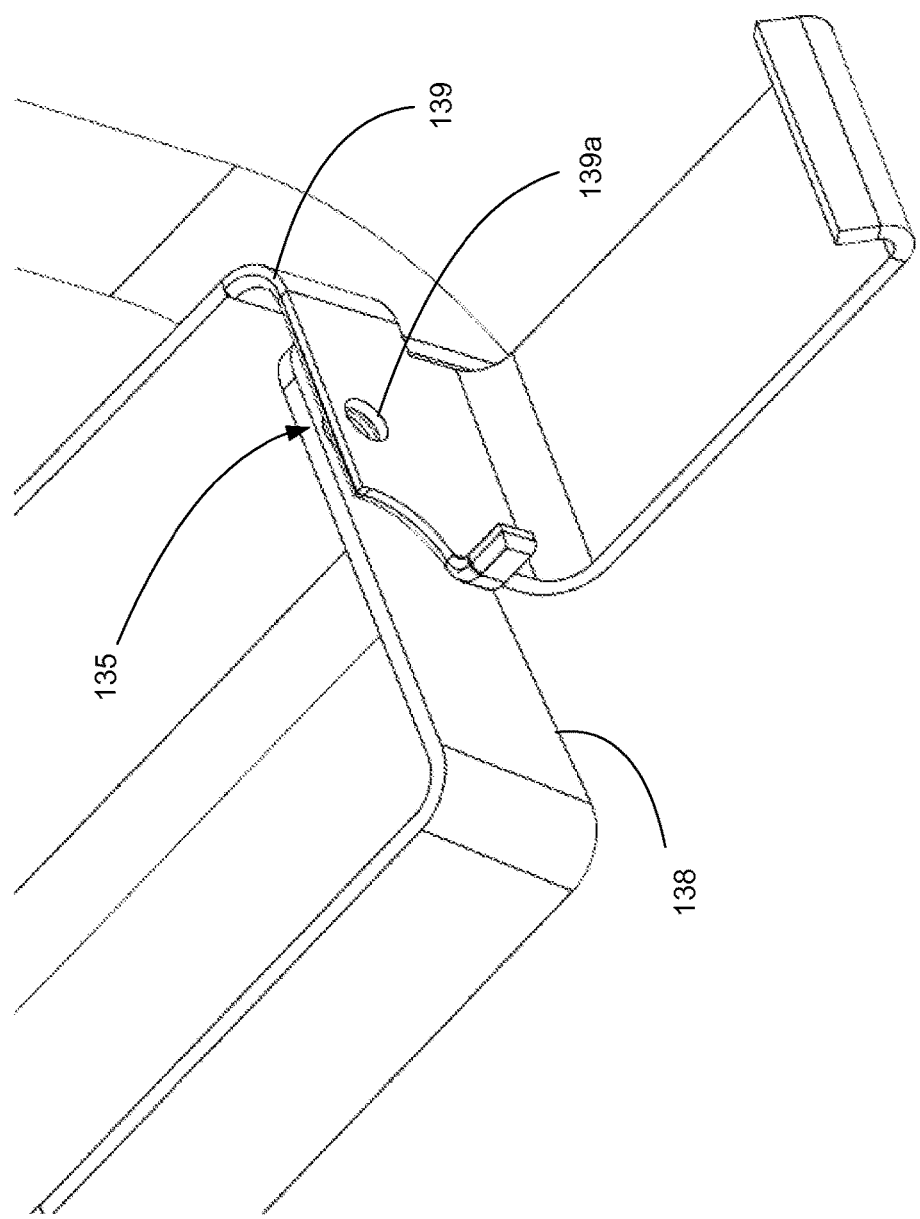
FIG. 20 illustrates a simplified perspective view of conductive members that can be used in a latch arm.

As can be appreciated from FIG. 8, a frequency response of RFID circuit 30' is shown as line 71 while a frequency response of RFID circuit 30'' is shown as line 72. The resonance 71a has a frequency that is about 0.2 GHz different than resonance 72a at the peak. For many antennas it may be desirable to have a change of at least 0.1 GHz in the resonance so that the initial configuration does not create a false positive. Smaller frequency changes can also be used in situations where the antenna has a high Q, thus any shorting of a break in the antenna pattern that shifts the performance of the antenna from a non-working performance to a working performance is suitable/sufficient unless otherwise noted.

FIGS. 9-21 illustrate an embodiment of a connector system 110. A first connector 120 with a first body 121 is configured to mate with a second connector 150 that has a body 151. Both connectors are configured to support terminals that allow for an electrical connection between the first and second connectors (so as to deliver power or signals, as is common for connectors). The body 121 of the first connector 120 includes a first lip 142 and a second lip 143 that together define a cavity 144. The cavity 144 is configured to receive an edge 152 of the body 152 of the second connector 150. The first connector 120 can include a gasket 122 configured to provide a water resistant seal with the edge 152. Thus the depicted connector configuration provides an interlocking sealed connector system but less robust connector body structures can also be used. In other words, the connector structure could be any suitable design and the depicted structure is merely representative of a possible mechanical design and is not intended to be limiting. Therefore, all that is required, unless otherwise noted, is that the bodies of the two connectors mate together.

The first connector 120 includes an antenna pattern 137 provided on the body 121 that is part of an RFID circuit 130 and the RFID circuit 130 includes a IC chip 131. The antenna pattern 137 can be at least partially plated onto the surface of the body 121, as depicted. The antenna pattern 137 includes a first portion 132 and a second portion 133 that are electrically separated by break 135 provided on latch arm 145 when the first connector is in an unmated condition. The break 135 is formed by a mechanical gap that is provided between a first conductive member 138 and a second conductive member 139 when the first connector 120 is in an unmated condition. Specifically, the first conductive member 138 includes a dimple 138a that is aligned with an aperture 139a in second conductive member 139. As can be appreciated, the first conductive member 138 is part of first portion 132 while the second conductive member 139 is part of second portion 133. Thus the first and second conductive members 138, 139 can be considered terminals that are electrically connected to (and part of) the antenna pattern.

In operation, when the latch arm 145 engages a retaining member 156 of the second connector 150 the first conductive member 138 is pressed toward the second conductive member 139 so that the dimple 138a engages (e.g., presses into) the aperture 139a. This provides an electrical connection between the first portion 132 and the second portion 133 and allows the IC chip 131 (which is shown not positioned on IC location 131a in FIG. 15) to be connected to the antenna pattern 137 with an desired resonance frequency so that the RFID circuit 130 can function as intended.

One benefit of the depicted design is that the dimple 138a has a curved surface that slides into engagement with the aperture 139a. This helps provide a more reliable electrical connection between the first conductive member 138 and the second conductive member 139 and helps ensure the RFID circuit works as intended when the first connector 120 mates to the second connector 150. Thus the dimple 138a and aperture 139a should also provide for a more reliable connection then just having flat portions of the first conductive member 138 engage a flat portion of the second conductive member 139. It should be noted that the dimple 138a, which is an example of a projection, could be provided on either conductive member and the aperture could be omitted and just a projection could be used. The benefit of the aperture is that there is less of a gap needed between the first and second conductive members 138, 139, which allows for tighter tolerances and more desirable mechanical retention between the first and second connectors 120, 150.

As can be appreciated, the embodiment depicted in FIGS. 9-21 has the benefit of being entirely self-contained on one connector. The conductive members are designed so that they have a break in an unmated form but the break can be shorted because the conductive members can contact each other when the connector is mated. This is beneficial as it allows for a design that could add or modify the RFID circuit without being concerned that the modified RFID circuit would not be compatible with the mating connector. In addition, there is no need to include a bridge on a second connector so manufacturing processes can be simplified for the second connector.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A connector system, comprising:
a first connector with a first set of terminals and a first housing that includes an RFID circuit, the RFID circuit including an antenna pattern with a break; and
a second connector with a second set of terminals and a second housing configured to mate with the first housing so that the second set of terminals mate with the first set of terminals, the second housing including a latch with a bar, the bar configured so that when the first connector is mated to the second connector, the bar bridges the break in the RFID circuit so that the RFID circuit functions in a desired manner.

2. The connector system of claim 1, wherein the bar causes the frequency response of the antenna pattern to be adjusted by at least 0.1 GHz.

3. The connector system of claim 1, wherein the first connector includes a retaining member and the latch rides up and is retained by the retaining member when the first and second connectors are in a mated condition.

4. A connector system, comprising:
a first connector having an RFID circuit formed thereon, the RFID circuit includes an antenna pattern and an RFID chip, the antenna pattern having first, second and third portions, the first and second portions defining a break therebetween, the RFID chip connecting the second portion to the third portion; and
a second connector configured to mate with the first connector, the second connector having a latch arm, the latch arm having a bar,
wherein, when the first connector is not fully mated to the second connector, the antenna pattern has a resonance at a first frequency that is outside of a desired operating frequency range, and
wherein, when the first connector is fully mated to the second connector, the bar bridges the break such that the antenna pattern has a resonance at a second frequency that is within the desired operating frequency range.

5. A connector system, comprising:
a first connector having a body, a latch arm and an RFID circuit, the body being configured to support a plurality of terminals, the RFID circuit includes an antenna pattern and an RFID chip, the antenna pattern having first and second portions, the RFID chip being associated with one of the first and second portions, the first portion having a first conductive member that is positioned on the latch arm, the second portion having a second conductive member that is positioned on the latch arm; and
a second connector configured to mate with the first connector, the second connector having a retaining member,
wherein, when the first connector is not fully mated to the second connector, a mechanical gap is provided between the first and second conductive members, the mechanical gap defining a break in the antenna pattern, and
wherein, when the first connector is fully mated to the second connector, the latch arm engages the retaining member and the first conductive member is pressed into electrical connection with the second conductive member.

6. The connector system of claim 5, wherein the antenna pattern includes portions that are plated on the body.

7. The connector system of claim 5, wherein the first conductive member has a projection that is configured to press against the second conductive member when the latch arm engages the retaining member.

8. The connector system of claim 5, wherein the first conductive member has a projection and the second conductive member has an aperture and the projection is configured to engage the aperture when the latch arm engages the retaining member.

9. The connector system of claim 5, wherein the antenna pattern has a first resonance when the first and second conductive members are electrically separated and has a second resonance when the first and second conductive members are electrically connected and the first and second resonances are at frequencies that are at least 0.1 GHz apart.

* * * * *